Dec. 26, 1939.  H. H. MOSS  2,184,560
METHOD OF AND APPARATUS FOR FORMING SHAPED EDGE ON METAL MEMBERS
Original Filed March 28, 1935
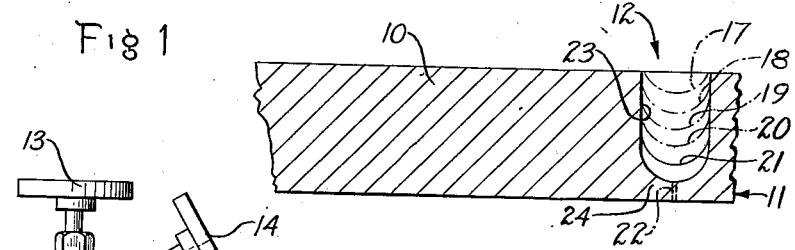
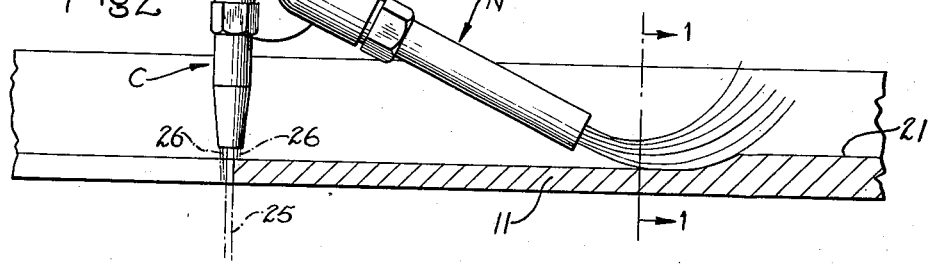
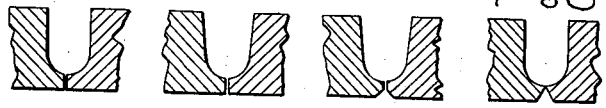
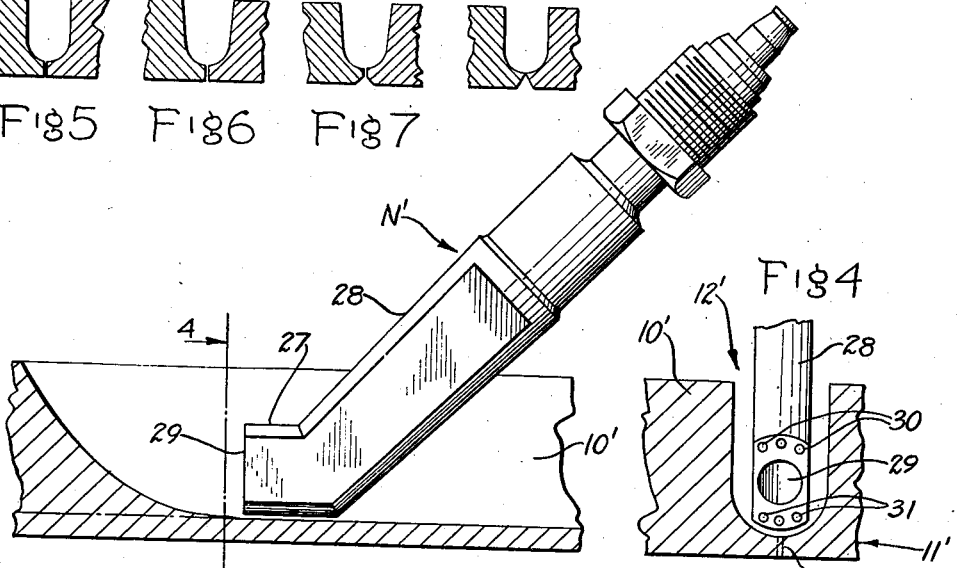
INVENTOR.
HERBERT H. MOSS
BY
ATTORNEY.

Patented Dec. 26, 1939

2,184,560

UNITED STATES PATENT OFFICE 2,184,560

METHOD OF AND APPARATUS FOR FORMING SHAPED EDGE ON METAL MEMBERS

Herbert H. Moss, Brooklyn, N. Y., assignor, by mesne assignments, to Union Carbide and Carbon Corporation, a corporation of New York Application March 28, 1935, Serial No. 13,392
Renewed November 2, 1938

16 Claims. (Cl. 148—9)

This invention relates to a method of and apparatus for thermo-chemically cutting or severing ferrous metal bodies for forming shaped edges on metal members, and more particularly to a method of and apparatus for shaping and truing edges of metallic plates and other structural shapes to prepare them for subsequent union by welding.

In uniting or joining steel members by welding it is usually necessary that the opposed edges be straight and also true or at right angles to the surfaces of the members, so that the members, after having a portion of their edges chamfered, can be properly aligned for welding. It has generally been the practice to provide a true edge on a metal member by making a cut that extends through the entire thickness of the member. Subsequently a portion of the edge surface metal is removed to provide an edge having a chamfered portion and a lip portion, such edge forming a groove suitable for welding when aligned opposite a similarly shaped edge. When a cut is made mechanically through the entire thickness of a metal member, particularly in a relatively thick metallic plate, a relatively large machine must be employed; and when such a cut is effected by a cutting torch, large quantities of combustible gas and oxidizing gas are required.

In accordance with the present method shaped edges on metal members are produced by forming a groove along and in one surface of a metal member, and then making a cut lengthwise of the groove from the wall thereof through a portion of the member to its other surface. In this manner the chamfered portion of an edge suitable for welding is provided, and at the same time the thickness of the metal member through which the cut is made is reduced considerably.

In carrying out the present method in practice the groove may be mechanically machined or flame machined along and in one surface of a metal member. The groove can quickly and readily be formed thermo-chemically by flame machining, as will be described hereinafter.

After the groove of the desired shape and depth is formed, a cut is made that extends from the wall of the groove to the surface of the metal member opposite to that having the groove. This cut may be effected mechanically, as by a shear machine, for example; or preferably may be made by flame cutting, as with a cutting blowpipe.

The present method of and apparatus for thermo-chemically forming shaped edges may be employed to cut in two parts a relatively large or wide metal member so as to produce the desired shape on both of the resulting edges. The method and apparatus is also particularly useful in forming shaped edges at the rough or irregular edges of steel plates and other structural shapes, as illustrated in the accompanying drawing, in which:

Fig. 1 is a sectional view of a plate which has an edge shaped according to this invention to provide a groove alongside and adjacent to an edge which is rough and irregular, and a cut extending along the groove and through the plate from the groove to the underside of the plate;

Fig. 2 is an elevational view of an exemplary apparatus according to the invention that illustrates one manner in which the groove and cut in Fig. 1 may be effected, a flame machining nozzle and a flame cutting nozzle being shown in metal removing and metal cutting relation, respectively, to the metal member;

Fig. 3 is an elevational view of another flame machining nozzle in metal removing relation to a metal member to produce a groove along and in one surface thereof;

Fig. 4 is a sectional view, taken at line 4—4 of Fig. 3, the subsequent cut from the groove to the underside of the member being shown in dotted lines; and Figs. 5, 6, 7 and 8 are fragmentary sectional views illustrating pairs of plates having their edges previously prepared and arranged edge to edge preparatory to welding, each view showing a different manner of shaping a plate edge in accordance with the present method.

Referring to Fig. 1, a plate 10 having a rough and irregular mill edge 11 to be shaped is preferably supported in a suitable manner in a substantially horizontal position, and a groove 12 is produced at the top surface adjacent the edge 11. Although the groove may be formed mechanically, as previously stated, it is preferred to produce the groove by flame machining.

In order to produce the groove 12 by flame machining the metal removed must be heated to an ignition temperature before an oxidizing gas stream is applied thereto. The entire plate may be heated to an ignition temperature, as in a furnace, or an electric arc or high temperature heating flame or flames may be utilized to heat successive portions of the surface metal to an ignition temperature before an oxidizing gas stream is applied to such heated surfaces. Preferably a single nozzle N is employed, as shown in Fig. 2, to provide an oxidizing gas stream and a plurality of high temperature heating flames, The nozzle N may have a central passage for an oxidizing gas, such as oxygen or a mixture of oxygen and air; and a plurality of passages surrounding the central passage for delivering a combustible gas, such as a mixture of oxygen and acetylene, to produce the heating flames to heat the metal to be removed to an ignition temperature. The nozzle N may be connected to a blowpipe head H having valves provided with control knobs 13 and 14 for controlling the supply of oxidizing gas and combustible gas delivered to the nozzle N.

The nozzle N may be moved relatively to the plate 10 in any suitable manner. In order to produce straight grooves and cuts a self-propelled carriage is preferably used. Such a carriage may be driven along the surface of the plate and guided by a rail mounted thereon, the nozzle N and the head H being mounted on the carriage. Apparatus of this character is described and claimed in J. H. Bucknam and H. J. Miller application, Serial No. 1470, filed January 12, 1935.

The flame machined groove 12 may be produced by applying the nozzle N forwardly inclined at an acute angle to the top surface of the plate, adjacent the edge 11, and in the direction of the successive surface portions from which metal is to be removed. The gaseous heating flames issuing from the combustible gas passages heat to a kindling or ignition temperature the metal directly ahead of the nozzle; and the oxidizing gas stream, contacting the heated metal, causes the same to ignite and burn. As the heating flames and oxidizing gas stream are progressively applied on successive surface portions by advancing the nozzle along the surface in the general direction of gas flow, the removed metal is blown ahead of the cut as it is being made. After a cut has been started and is in progress, the preheating flames may be partially or completely shut off to effect an economy in gas consumption. This is possible because the oxidized metal or slag, which is driven forward and out of the cut by the force of the oxidizing gas stream, usually has sufficient residual heat to heat to a kindling temperature the surface portions attacked by the oxidizing gas stream. In many instances, however, it is desirable to apply heating flames during an entire flame machining operation so as to remove a greater amount of surface metal per cubic foot of oxidizing gas.

Although the metal removed can be reduced completely to an oxidized form, considerable economy can be effected in the amount of oxidizing gas used by removing a substantial portion of the metal without completely oxidizing it. The metal removed, comprising either oxidized metal or a mixture of oxidized metal and fused or molten metal, has been termed a "slag"; and such slag, blown ahead of a cut as it is being made, is reduced substantially to a non-adherent granular state. The characteristic type of cut made in this manner is a smooth groove having gradually sloping sides, as indicated by the dotted line 17 in Fig. 1.

To flame machine the relatively deep groove 12 a number of successive passes of the nozzle N are made with respect to the plate 10, the depth of each cut after an additional pass being indicated in Fig. 1 by the lines 18, 19, 20 and 21, and, when the final pass is made, the groove 12 of the desired depth is obtained.

Flame machining as just described has been successfully carried out in practice with oxidizing velocities ranging from 200 to 1,000 feet per second. In most applications, however, the pressure of the oxidizing gas is adjusted to produce an oxidizing gas stream having a velocity between 550 and 750 feet per second. The velocities of the oxidizing gas stream above-mentioned are the calculated velocities of the gas discharged from the nozzle, based on the assumption that a measured quality of gas discharged in a given time has a temperature of 70° F. and is at atmospheric pressure.

After the groove 12 is produced by flame machining, a cut may be made along the bottom of the groove, as indicated by the dotted lines 22 in Fig. 1, to provide a plate edge having a chamfered portion 23 and a lip portion 24. Although the cut may be effected mechanically, as by shearing through the remaining thickness, a cutting flame is preferably utilized to produce the square edge at the lip portion 24. The cut 22 may be made after the groove 12 is produced by mounting on the self-propelled carriage a cutting nozzle, and progressively moving such nozzle along successive portions of the bottom of the groove 12.

In order to expedite the preparation of plate edges for welding, the cut may be made simultaneously with the final pass of the oxidizing gas stream. The cutting nozzle C may be separately mounted on the carriage or connected to the same head H as the flame machining nozzle N to move in tandem relation therewith, as shown in Fig. 2, the nozzle C being provided with a central passage for delivering an oxygen cutting stream 25 and a plurality of combustible gas passages surrounding the central passage for producing high temperature heating flames 26. Oxygen and the combustible gas need only be supplied to the cutting nozzle C during the final pass of the nozzle N with respect to the groove. During this final pass the nozzle C may be arranged substantially perpendicularly to the under side of the plate to form a square edge on the lip portion 24. As in flame machining, the heating flames issuing from the nozzle C heat the metal at the bottom of the groove to an ignition or kindling temperature, so that the oxygen stream will burn through the plate and oxidize the metal to produce the cut. Since the cutting nozzle C is directly behind the flame machining nozzle N, considerable economy in gas consumption is effected because of the residual heat in the metal after being machined by the nozzle N, thus making it unnecessary to use the usual amount of preheating gases in the flames 26.

The shape of the groove produced is dependent upon the velocity of the oxidizing gas stream, the rate at which it is progressively applied to successive surface portions of a metallic body, and the particular angle at which it is directed on the surface. In certain instances, it may be desirable to shape plate edges in such a manner that, when two plates are arranged edge to edge, a U-shaped groove having substantially straight side walls is provided, as shown in Fig. 5; and in other instances it may be desirable to provide a U-shaped groove in which the side walls diverge toward the open top of the groove, as shown in Fig. 6. After a square edge is formed at the lip portion of a plate edge, it may sometimes be desirable to provide a beveled groove at the side of the plate opposite to that of the flame machined groove. This may be readily effected by passing the cutting nozzle C at an acute angle to the edge of the lip portion and progressively moving the nozzle along successive portions of the edge. When two plates having their edges prepared in this manner are arranged edge to edge a double groove of the character shown in Fig. 7 is obtained. In certain applications of welding it is frequently necessary to provide a V-shaped groove back to back with a larger U-shaped groove. In such instances, during the final pass of the flame machining nozzle N, the cutting nozzle C may be positioned at an acute angle to the under side of the plate. When the edges of two plates are prepared in this manner and arranged edge to edge, a joint of the type illustrated in Fig. 8 is obtained.

In Figs. 3 and 4, I have illustrated a nozzle N' which is particularly satisfactory for flame machining relatively deep grooves in plates, and which may be substituted for the nozzle N in the machining and cutting assembly shown in Fig. 2. A central oxidizing gas passage extends longitudinally of the nozzle from its inlet to the discharge orifice 29, bending at the juncture of a short outer section 27 and the main portion 28 of the tip. At the diametrically opposite top and bottom walls of the nozzle are two groups of combustible gas passages 30 and 31, respectively, which extend longitudinally of the nozzle, bending in a similar manner to the central passage at the juncture of the short outer section 27 and the main portion 28 of the nozzle. Nozzles of this character are described and claimed in the F. C. Geibig and W. J. Jacobsson application, Serial No. 1493, filed January 12, 1935.

To produce the groove 12' at the edge of the plate 10' with this nozzle, it is arranged with respect to the top surface so that the short outer section 27 is substantially parallel to the surface and near the bottom of the cut that is produced, as shown in Fig. 3. The oxidizing gas stream issuing from the discharge orifice 29 is applied in the direction of the successive surface portions from which metal is to be removed and is also substantially parallel to the surface and near the bottom of the cut. The combustible gas issuing from the passages 30 and 31 heats the metal directly ahead of the nozzle to an ignition temperature, and the oxidizing gas contacting the heated metal causes the same to ignite and burn. This oxidation or burning of the metal takes place in a definite manner to produce a smooth and even cut in one pass, and, when the cut assumes the form of a deep groove, as shown in Fig. 4, the heating flames and oxidizing gas stream are applied to the side walls as well as to the metal directly ahead of the nozzle.

The flame machined plate edges carry a very thin coating of iron oxides after the loose magnetic material has been removed from the surfaces. The thickness of this iron oxide film is substantially equal to a wave length of light, and beneath such oxide film there is a thin layer of metal containing carbon in an amount greater than that of the original metal before the flame machining operation. In this manner, a flame machined surface is so conditioned and improved that subsequent welding of two plates having such edge surfaces is considerably facilitated, and the resulting joint has a strength and uniformity superior to joints heretofore produced in this field of welding.

Although it has been stated that the present method is particularly useful for shaping edges of metal members preparatory to welding two such similarly prepared edges, edges shaped as described may be provided for fabrication in any other suitable manner. Also, instead of forming shaped edges that are true and straight, it should be apparent that the method can be employed to produce shaped edges that are either irregular, curved, or circular.

What is claimed is:

1. A method of forming a shaped edge on a metal member to prepare the same for welding, which comprises applying a low velocity gaseous metal removing medium against said member to form a groove along and in one surface thereof; and then severing a portion from said member by flame cutting lengthwise of the groove, such cut extending from the wall of such groove through the remaining thickness of said member to the surface of said metal member opposite to that having said groove.

2. A method of forming a shaped edge on a metal member which comprises forming a groove along and in one surface of a metal member, said groove being formed by flame machining and, while said metal forming the wall of said groove is still in a heated condition as a result of the flame machining, effecting a cut by flame cutting, such cut extending from the wall of such groove through the remaining thickness of said member to the surface of said metal member opposite to that having said groove.

3. A method of shaping and truing the edge of a metallic member which comprises forming a groove in one surface of said member along and adjacent to said edge, said groove being formed by flame machining and, while said metal forming the wall of said groove is still in a heated condition as a result of the flame machining, effecting a cut by flame cutting, such cut extending from a wall of said groove to the surface of said member opposite to that having said groove.

4. A method of forming a shaped edge on a metal member which comprises applying an oxidizing gas stream on a surface of said member, relatively moving said gas stream with respect to said member to form a groove in said surface, said gas stream being applied substantially parallel to said surface and near the bottom of the groove and in the direction of the successive portions from which metal is to be removed, the surface metal on which said gas stream is applied being at an ignition temperature, and subsequently making a cut along said groove, such cut extending from the wall of said groove to the other surface of said member.

5. A method of forming a shaped edge on a metal member to prepare the same for welding, which comprises applying a gaseous metal removing medium against said member to form a groove along and in one surface thereof; severing a portion from said member by making a cut lengthwise of said groove, such cut extending from the wall of such groove through the remaining thickness of said member to the surface of said metal member opposite to that having said groove, and with said groove forming a shaped edge on said member having a chamfered portion and a lip portion; and making a cut along the lip portion of said edge surface to provide a bevelled edge extending from the edge of said lip portion to the surface of said plate opposite to that adjacent to said chamfered portion.

6. A method of forming a shaped edge on a metal member which comprises applying an oxidizing gas stream at an acute angle to a surface of said member in the direction of the successive surface portions from which metal is to be removed, relatively moving or passing said gas stream a plurality of times with respect to said surface, a surface layer of metal being removed with each pass of said gas stream to form a groove in said surface, the surface metal against which said gas stream is applied during each pass being at an ignition temperature, and thereafter making a cut along said groove, said cut being effected by a cutting flame, and said cutting flame being applied on said member and moved relatively thereto simultaneously with said gas stream during the final pass of the latter with respect to said member.

7. A method of shaping and truing the edge of a metal plate to prepare the same for welding which comprises removing metal from one side of said plate by successive parallel passes of a gaseous metal removing medium applied along and adjacent to said edge, to form a groove along and adjacent to said edge; and, during the final pass of said medium, severing a portion from said plate by making a cut parallel to said groove from the wall of the latter to the other side of said plate.

8. A method of forming a shaped edge on a metal member to prepare the same for welding, which comprises applying an oxidizing gas stream at an acute angle to a surface of said member in the direction of the successive surface portions from which metal is to be removed; relatively passing said gas stream a plurality of times with respect to said surface, a surface layer of metal being removed with each pass of said gas stream to form a groove in said surface, the surface metal on which said gas stream is applied during each pass being at an ignition temperature; and thereafter severing a portion from said member by making a cut along said groove by applying a gaseous metal removing medium to the bottom surface of said groove at an angle different from said acute angle, such cut extending from the wall of said groove to the other surface of said member.

9. A method of forming a shaped edge on a metal member, which comprises progressively applying a low velocity oxygen machining jet along said member, and simultaneously progressively applying a high velocity cutting oxygen jet to said member behind said machining jet.

10. A method of forming a shaped edge on a metal member, which comprises applying a gaseous heating flame on a portion of the body to heat said portion to a temperature at which it will ignite in an oxidizing gas stream; applying a low velocity oxygen machining jet on such heated metal; advancing said low velocity jet along said member; and, at a point behind said stream and sufficiently close thereto that additional heating of the metal is unnecessary, applying and simultaneously advancing a high velocity cutting jet.

11. A method of thermo-chemically cutting ferrous metal bodies, which comprises applying at least one forwardly inclined oxidizing gas stream to a surface of said metal body, at least a part of said surface against which said stream is applied being at an ignition temperature; relatively moving said gas stream and said body; and during such relative movement applying another oxidizing gas stream of higher velocity than the first stream against the surface to the rear of said first mentioned gas stream to penetrate through the body.

12. A method of thermo-chemically cutting ferrous metal bodies, which comprises the steps of progressively heating the metal to the kindling temperature, directing a stream of low velocity oxidizing gas against successive portions of the heated surface of the metal to form a groove therein and heat the metal of such groove; and following such low velocity stream wth a high velocity stream of oxidizing gas directed against successive portions of said heated groove.

13. Apparatus for thermo-chemically cutting a body of metal, comprising the combination of supporting means; nozzle means carried by said supporting means for applying a stream of oxidizing gas at low velocity obliquely against the surface of said body along the line of cut; nozzle means carried by said supporting means for applying a stream of oxygen at high velocity to said surface along the line of cut and behind said low velocity stream; and means for providing relative motion between said supporting means and said body to advance said nozzles along the line of cut.

14. Apparatus for thermo-chemically cutting a body of meal, comprising the combination of nozzle means for applying a low velocity stream of oxidizing gas obliquely against and along the surface of said body; nozzle means positioned behind said first mentioned nozzle means for applying a high velocity stream of oxidizing gas to the surface of said body; and means for providing relative motion between said gas applying means and said body in the direction of cutting.

15. A method of thermo-chemically cutting a ferrous metal body which comprises arranging a low velocity oxidizing gas stream in tandem relation with a high velocity oxidizing gas stream; and simultaneously directing said streams against portions of said body heated to an ignition temperature while maintaining said low velocity stream ahead of said high velocity stream and while causing movement of said streams in unison and in tandem relation relatively to said body along the cutting line.

16. A method of thermo-chemically cutting a ferrous metal body, as claimed in claim 15, in which said low velocity stream is directed obliquely against successive portions of said body to remove metal and form a groove; and said high velocity stream is directed against successive portions of the bottom of said groove while said bottom still retains heat produced by the metal-removing action of said low velocity stream.

HERBERT H. MOSS.